United States Patent
Arnold et al.

(10) Patent No.: US 11,762,874 B2
(45) Date of Patent: Sep. 19, 2023

(54) INTERACTIVE WORKFLOW FOR DATA ANALYTICS

(71) Applicant: Alteryx, Inc., Irvine, CA (US)

(72) Inventors: Jeff Arnold, Arvada, CO (US); Cassandra Clark, Broomfield, CO (US); Stephen Edwin Link, Los Angeles, CA (US)

(73) Assignee: Alteryx, Inc., Irvine, CA (US)

( * ) Notice: Subject to any disclaimer, the term of this patent is extended or adjusted under 35 U.S.C. 154(b) by 226 days.

(21) Appl. No.: 17/387,343

(22) Filed: Jul. 28, 2021

(65) Prior Publication Data

US 2023/0035213 A1 Feb. 2, 2023

(51) Int. Cl.
| | | |
|---|---|---|
| *G06F 16/00* | (2019.01) | |
| *G06F 16/25* | (2019.01) | |
| *G06F 16/23* | (2019.01) | |
| *G06F 3/04817* | (2022.01) | |
| *G06F 16/26* | (2019.01) | |
| *G06F 16/28* | (2019.01) | |

(52) U.S. Cl.
CPC ........ *G06F 16/254* (2019.01); *G06F 3/04817* (2013.01); *G06F 16/2358* (2019.01); *G06F 16/252* (2019.01); *G06F 16/26* (2019.01); *G06F 16/287* (2019.01)

(58) Field of Classification Search
CPC ............. G06F 16/252; G06F 16/24552; G06F 3/04817
See application file for complete search history.

(56) References Cited

U.S. PATENT DOCUMENTS

| | | | | |
|---|---|---|---|---|
| 10,162,624 | B1 * | 12/2018 | Moturu | G06F 9/45529 |
| 10,664,777 | B2 * | 5/2020 | Volkov | G06Q 10/0633 |
| 2007/0143736 | A1 | 6/2007 | Moriarty et al. | |
| 2008/0040181 | A1 * | 2/2008 | Freire | G06Q 10/103 |
| | | | | 705/7.26 |
| 2010/0153132 | A1 * | 6/2010 | Barth | G16Z 99/00 |
| | | | | 705/2 |
| 2015/0178062 | A1 * | 6/2015 | Adderly | G06F 8/65 |
| | | | | 717/170 |
| 2018/0330288 | A1 | 11/2018 | Harding et al. | |
| 2019/0114085 | A1 | 4/2019 | Harding et al. | |
| 2022/0058065 | A1 * | 2/2022 | Kiefer | G06F 9/541 |
| 2022/0147344 | A1 * | 5/2022 | Johnston | G06F 9/5027 |
| 2022/0236965 | A1 * | 7/2022 | Rahill-Marier | G06F 9/451 |

OTHER PUBLICATIONS

PCT International Search Report and Written Opinion, PCT Application No. PCT /US22/37869, dated Dec. 6, 2022, 16 pages.

* cited by examiner

*Primary Examiner* — Cheryl Lewis
(74) *Attorney, Agent, or Firm* — Fenwick & West LLP

(57) ABSTRACT

A data analytics application receives a workflow that includes a sequence of tools. Each tool in the sequence performs a data analytics function. The data analytics application generates an interactive element for a tool in the sequence based on the data analytics function of the tool in the workflow. The interactive element is applied to the tool to update the workflow. The interactive element may be affiliated to the tool or be added into the analytics workflow as a new tool. The updated workflow is provided for processing a data file. The updated analytics workflow generates a result item representing an outcome of the processing of the data file. The interactive element applied to the tool is adapted to receive a user input and to trigger an operation of the tool based on the user input to generate a different result item.

20 Claims, 8 Drawing Sheets

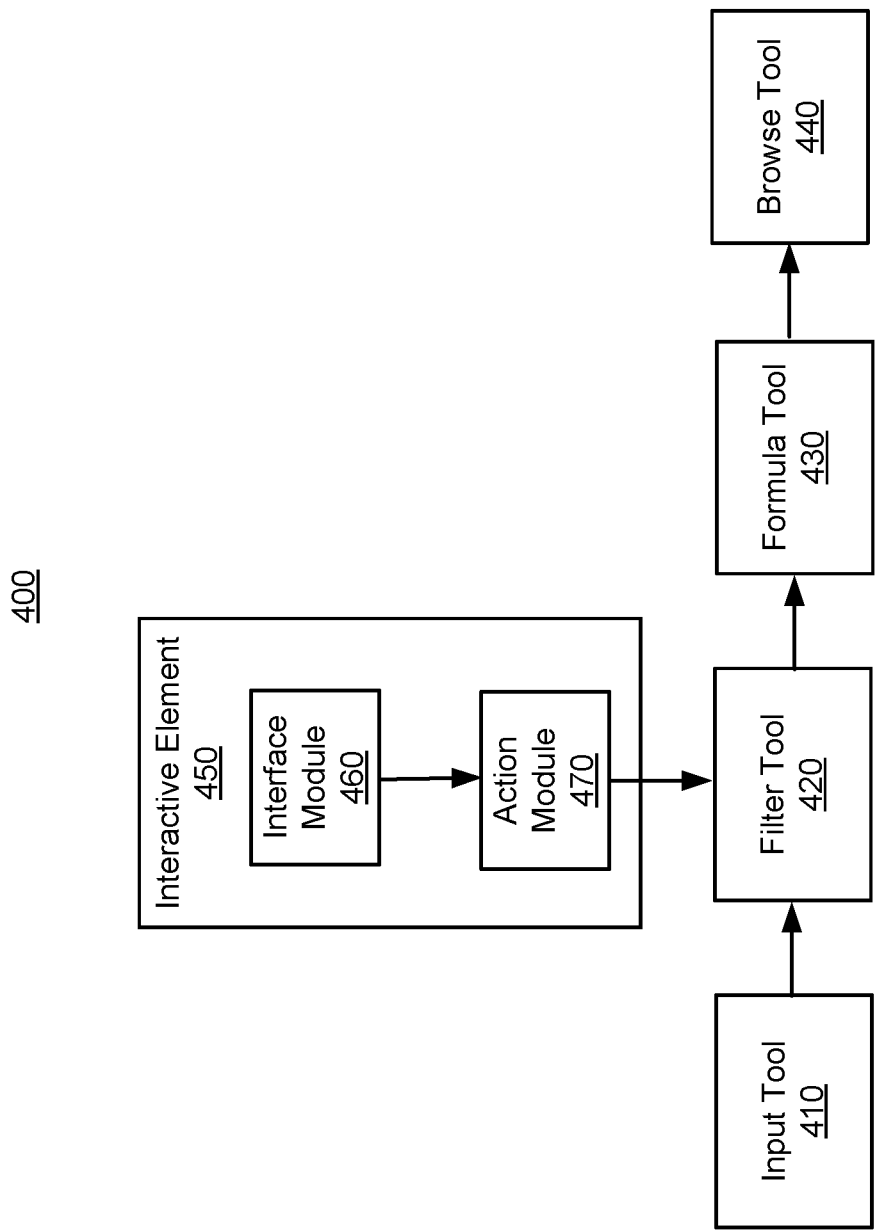

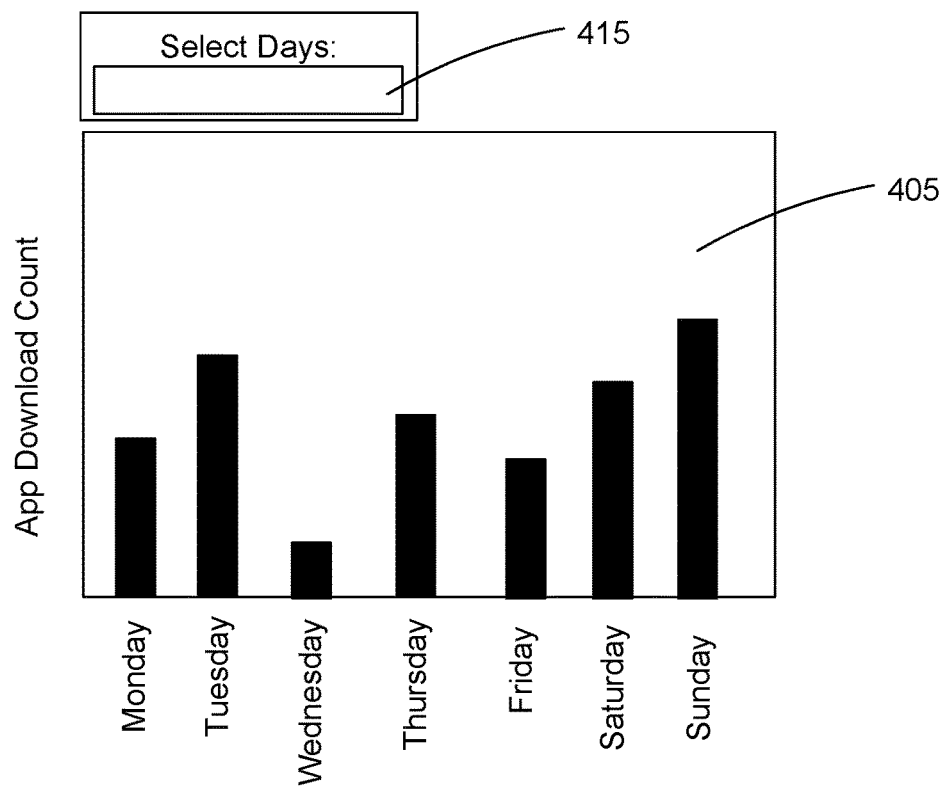
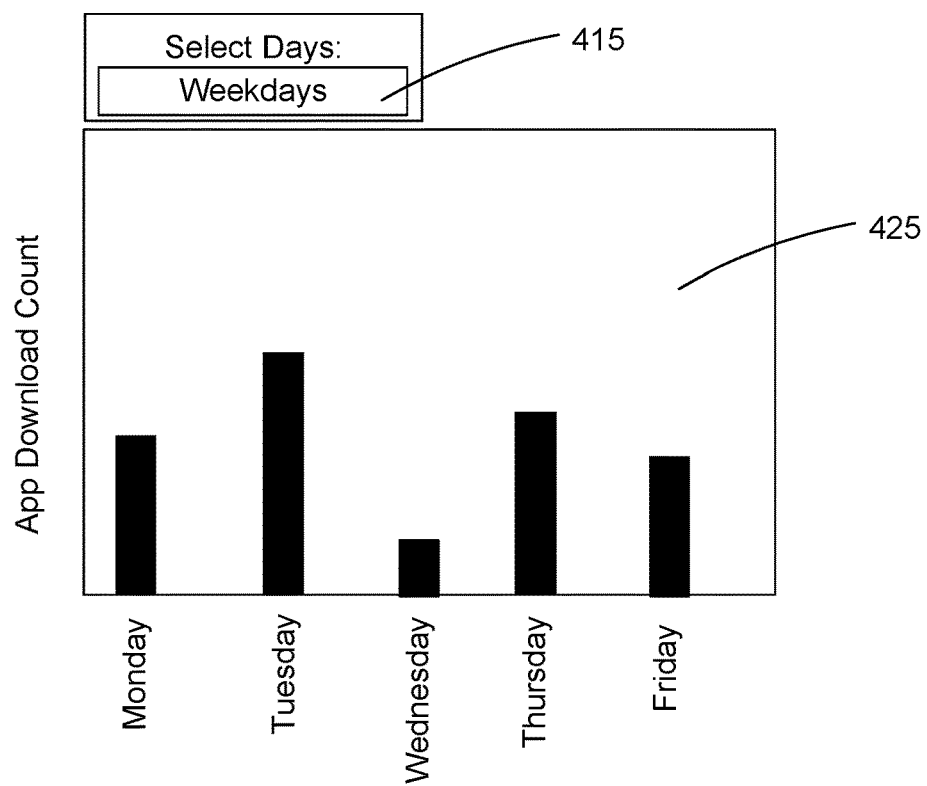
FIG. 4B

600

```
Receive an analytics workflow comprising a sequence of
tools, each tool in the sequence performing a data analytics
function
610
```
↓
```
Generate an interactive element for a tool in the sequence
based on the data analytics function of the tool in the
analytics workflow, the interactive element is adapted to
receive a user input and to trigger an operation of the tool
based on the user input
620
```
↓
```
Apply the interactive element to the tool to update the
analytics workflow
630
```
↓
```
Provide the updated analytics workflow for processing a data
file, the updated analytics workflow adapted to generate a
result item representing an outcome of the processing of the
data file
640
```

INTERACTIVE WORKFLOW FOR DATA ANALYTICS

BACKGROUND

Field of Art

The described embodiments pertain in general to data analytics, and in particular to an interactive analytics workflow.

Description of the Related Art

The growth of data analytic platforms, such as Big Data Analytics, has expanded data processing into a tool for processing large volumes of data to extract information having business value. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

Currently, analytics workflows are widely used to perform data processing. However, the currently available workflow tools are limited due to their run-and-quit applications, meaning these tools run a workflow to perform a data processing task and quit once the task is finished. It is hard to perform another data processing task without creating and running a new workflow. Given the limitation of the current data analytics technology, improved analytics technologies are needed for more efficient processing of large data sets.

SUMMARY

The above and other issues are addressed by a computer-implemented method, computer system, and computer-readable storage medium for managing memory in a computer. An embodiment of the computer-implemented method includes receiving an analytics workflow comprising a sequence of tools. Each tool in the sequence performs a data analytics function. The method further includes generating an interactive element for a tool in the sequence based on the data analytics function of the tool in the analytics workflow. The interactive element is adapted to receive a user input and to trigger an operation of the tool based on the user input. The method further includes applying the interactive element to the tool to update the analytics workflow. The method also includes providing the updated analytics workflow for processing a data file. The updated analytics workflow is adapted to generate a result item representing an outcome of the processing of the data file.

An embodiment of the computer system includes a computer processor for executing computer program instructions. The system also includes a non-transitory computer-readable storage medium storing computer program instructions that when executed cause the computer processor to perform operations. The operations include receiving an analytics workflow comprising a sequence of tools. Each tool in the sequence performs a data analytics function. The operations further include generating an interactive element for a tool in the sequence based on the data analytics function of the tool in the analytics workflow. The interactive element is adapted to receive a user input and to trigger an operation of the tool based on the user input. The operations further include applying the interactive element to the tool to update the analytics workflow. The operations also include providing the updated analytics workflow for processing a data file. The updated analytics workflow is adapted to generate a result item representing an outcome of the processing of the data file.

An embodiment of the non-transitory computer-readable memory stores executable computer program instructions. The instructions are executable to perform operations. The operations include receiving an analytics workflow comprising a sequence of tools. Each tool in the sequence performs a data analytics function. The operations further include generating an interactive element for a tool in the sequence based on the data analytics function of the tool in the analytics workflow. The interactive element is adapted to receive a user input and to trigger an operation of the tool based on the user input. The operations further include applying the interactive element to the tool to update the analytics workflow. The operations also include providing the updated analytics workflow for processing a data file. The updated analytics workflow is adapted to generate a result item representing an outcome of the processing of the data file.

BRIEF DESCRIPTION OF DRAWINGS

FIG. 4A is a schematic diagram illustrating an interactive workflow created using the data analytics application according to one embodiment.

FIG. 4B is a schematic diagram illustrating result items generated by the interactive workflow according to one embodiment.

FIG. 6 is a flow chart illustrating a process of generating an interactive workflow according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
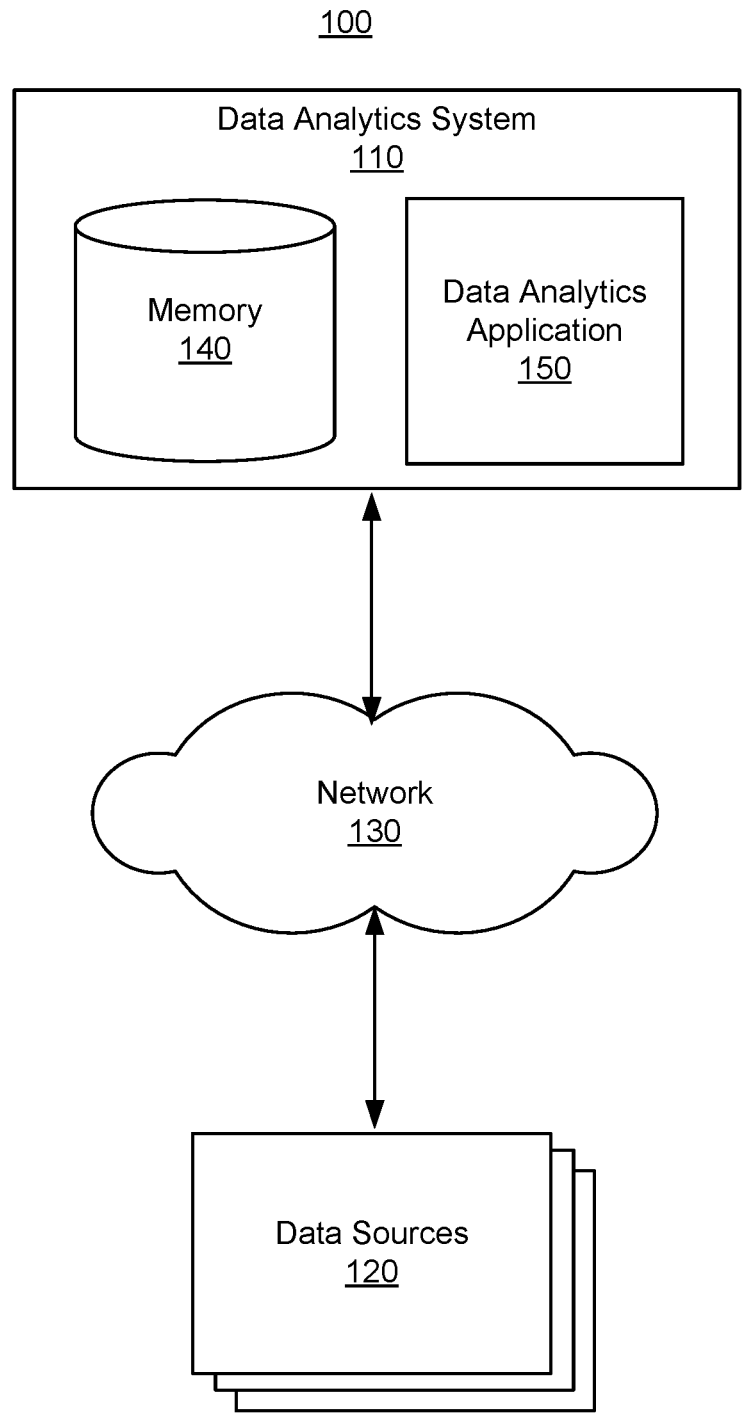
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data analytics system 110 is a computer-based system utilized for processing large amounts of data. The data are collected, gathered, or otherwise accessed from the multiple data sources 120 via the network 130. The data analytics system 110 can implement scalable software tools and hardware resources employed in data processing tasks from a wide variety of data sources. A data processing task (also referred to as a task or data analytics task) is a computing operation for processing data. A data processing task includes, e.g., accessing data, preparing data, blending data, packaging data, analyzing data, other types of operations on data, or some combination thereof. The data analytics system 110 can perform multiple tasks in parallel. When it has computer resources (e.g., memory) available, the data analytics system 110 can pick a task to perform from a plurality of tasks that are ready to be performed.

In the embodiment of FIG. 1, the data analytics system 110 includes a memory 140 and a data analytics application 150. The memory 140 stores data used in data analytic operations and provides access to data storage area(s). In some embodiments, the memory 140 includes random access memory (RAM), hard disk drive (HDD), solid-state drive (SSD), other forms of computer memory, or some combination thereof. In some embodiments, the memory 140 includes a primary memory 140 providing relatively fast access to a relatively small data storage area and a secondary memory 150 providing relatively slow access to a relatively large data storage area.

Figure 2:
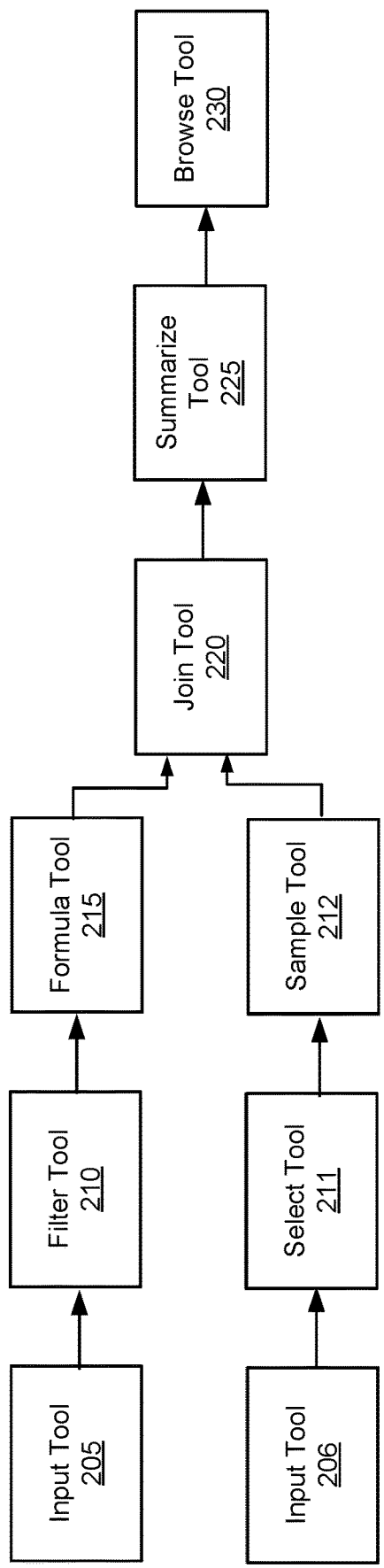
FIG. 2 is a block diagram illustrating a workflow created using the data analytics system to process data according to one embodiment.

The data analytics application 150 is a software application supporting execution of data analytics tasks by using workflows, such as the workflow illustrated in FIG. 2. A workflow (also referred to as "analytics workflow") is a sequence of data processing tools (also referred to as tools), through which a data analytics task passes from initiation (e.g., input of a data file) to completion (e.g., output of an outcome of the task). Each tool in the sequence performs a specific processing operation or data analytics function, such as input, output, preparation, join, predictive, spatial, investigation, parse, transform, and so on. Execution of the workflow includes operations of the tools in the workflow and generates a result item representing the outcome of the task. The result item, in one example, is a chart that provides a visual representation of the outcome of the task.

The data analytics application 150 provides an environment that facilitates creation of workflows. For instance, the data analytics application 150 provides a visual workflow environment supported by a GUI of the data analytics application 150. The visual workflow environment enables a set of drag and drop tools that eliminate the need for providing software code to design a workflow and eliminate the need to identify complex formulas to be implemented by a workflow. In another embodiment, the workflow 200 is created and described in a document, such as an extensible markup language (XML) document.

Figure 5:
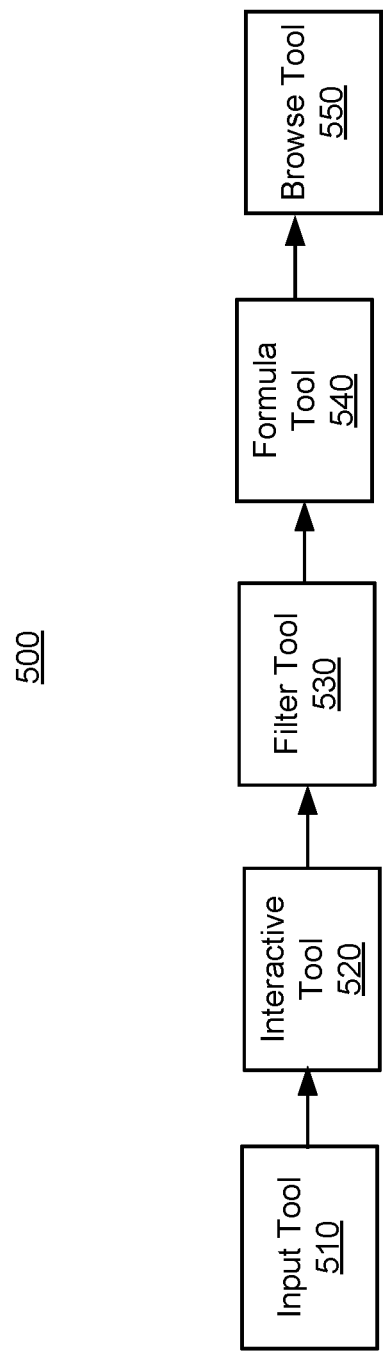
FIG. 5 is a schematic diagram illustrating another interactive workflow created using the data analytics application according to one embodiment.

The environment also facilitates creation of interactive workflows, such as the workflows illustrated in FIGS. 4A and 5. An interactive workflow is a workflow that includes an interactive element coupled with a particular tool in the workflow. The data analytics application 150 generates the interactive element based on the data analytics function of the particular tool. The data analytics application 150 applies the interactive element to the particular tool, by either affiliating the interactive element with the particular tool or adding the interactive element into the workflow as a new tool preceding the particular tool.

The interactive workflow can execute without or without user inputs, or with different user inputs. Execution of the interactive workflow generates an interface icon and a result item. The interface icon is defined by the interactive element and is in communication with the interactive element. The interface icon is adapted to receive user inputs and send the user inputs to the interactive element. After receiving a user input, the interactive element triggers an operation of the particular tool based on the user input. It may also trigger operations of other tools in the workflow that are subsequent to the particular tool, if any. At least a part of the workflow is executed responsive to the user input. The execution of the workflow generates a new result item that incorporates the user input.

For purpose of illustration, taking an interactive element coupled with a filter tool in a workflow for example, the interactive element defines its interface icon as clickable buttons that allow a user to click to select a date. The interactive element is adapted to manipulate an operation of the filter tool by using the date selected by the user as a filtering parameter. In this example, the result item of the workflow is a chart illustrate data for different dates. The chart includes clickable icons corresponding to the dates. The user, interested in data for a particular date, can click the corresponding clickable icon in the chart. The user's click is transmitted to the interactive element. The interactive element sends the particular date to the filter tool and triggers the filter tool to filter data based on the particular date, e.g., select data associated with the particular date. Also, the subsequent tools are triggered to process the selected data, which generates a new chart that represents data for the particular date. The new chart may replace the previous chart or is presented to the user in addition to the previous chart.

The interactive workflows generated by the data analytics application 150 are advantageous as they allow users to manipulate a data processing result by simply interacting with the interface icon without creating a new workflow or changing data input into the workflow. Such interactive workflows do not just run and quit. Instead, they can re-run as users interact with their interface icons and generate new results based on the user interaction. Thus, the data analytics application 150 provides a more convenient and efficient data analytics tool, compared with the conventional data analytics technologies.

In some cases, the data analytics application 150 provides software that supports networked, or cloud-based, access to data analytic tools and macros to multiple end users. As an example, the data analytics application 150 supports creation of workflows in a manner of dashboard, web application, mobile application, etc. As another example, the data analytics application 150 allows users to share, browse and consume analytics in a manner similar to a mobile application store or other cloud-based service. Analytic data, macros and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 150 can perform functions associated with analytic apps such as creating, deploying, publishing, iterating, updating and the like.

Additionally, the data analytics application 150 can support functions performed at various stages involved in data analytics, such as the ability to access, prepare, blend, analyze, and output analytic results. In some cases, the data analytics application 150 can access the various data sources, retrieving raw data, for example, in a stream of data. Data streams collected by the data analytics application 150 can include multiple records of raw data, where the raw data is in differing formats and structures. After receiving at least one data stream, the data analytics application 150 can perform operations to allow records of the data stream to be used as an input into data analytic operations. Moreover, analytic functions involved in statistical, qualitative, or quantitative processing of records, such as predictive analytics (e.g., predictive modelling, clustering, data investigation) can be implemented by data analytics application 150.

As mentioned above, the data sources 120 provide electronic data to the data analytics system 110. A data source 120 may be a computer, a database, a network API (application programming interface), or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130. The data provided the data sources 120 is typically organized into data records, which each data record including one or more values. For example, a data record provided by a data source may include a series of comma-separated values. The data describes information of relevance to an enterprise using the data analytics system. For example, data from a data source 120 can describe computer-based interactions (e.g., click tracking data) with content accessible on websites and/or with social media applications.

The network 130 represents the communication pathways between the data analytics system 110 and the data sources 120. In one embodiment, the network 130 is the Internet and uses standard communications technologies and/or protocols. The data exchanged over the network 130 can be represented using technologies and/or formats including the hypertext markup language (HTML), the extensible markup language (XML), etc. In another embodiment, the entities can use custom and/or dedicated data communications technologies instead of, or in addition to, the ones described above.

FIG. 2 is a block diagram illustrating a workflow 200 created using the data analytics system 110 to process data according to one embodiment. The workflow 200 is executed by a computer device of the data analytics system 110. However, in other embodiments, the workflow 200 is deployed to another computer device that may be communicatively connected, via a network (e.g., the network 130), to the data analytics system 110.

A workflow can include a series of tools that perform specific processing operations or data analytics functions. The tools are arranged in an order. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A record, including an aggregated group of individual records, can be passed through the tools of a workflow, which allows for the individual processing operations to operate more efficiently on the data. Such data aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools can execute in parallel.

As illustrated, the workflow 200 of FIG. 2 includes input/output tools, illustrated as input tools 205 and 206, and browse tool 230. The input tools 205 and 206 function to access records from particular data sources 120. The inputs tools 205 and 206 bring into the workflow the accessed records and provide the records to the subsequent tools of the workflow 200. In this example, the input tool 205 provides accessed records to a filter tool 210 and the input tool 206 provides accessed records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparations tools, shown as the filter tool 210, the select tool 211, a formula tool 215, and a sample tool 212. The filter tool 210 queries records based on an expression and splits the data into two streams, a true stream that includes records that satisfy the expression and a false stream that includes records that do not satisfy the expression. The select tool 211 can be used to select, deselect, re-order and rename fields, change field type or size, and assign a description. The formula tool 215 creates or updates fields using one or more expressions to perform a broad variety of calculations and/or operations. The sample tool 212 limits a received stream of records to a number, percentage, or random set of records.

The workflow 200 also includes a join tool 220 that blends multiple data sources. Specifically, the join tool 220 combines two input data streams based on common fields (or record position). The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass records one at a time through the filter tool 210 and the formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 may implement their own parallel operations, such as initiating a read of a block of data while processing the last block of data or breaking computer-intensive operations, such as a sort tool, into multiple parts.

Figure 3:
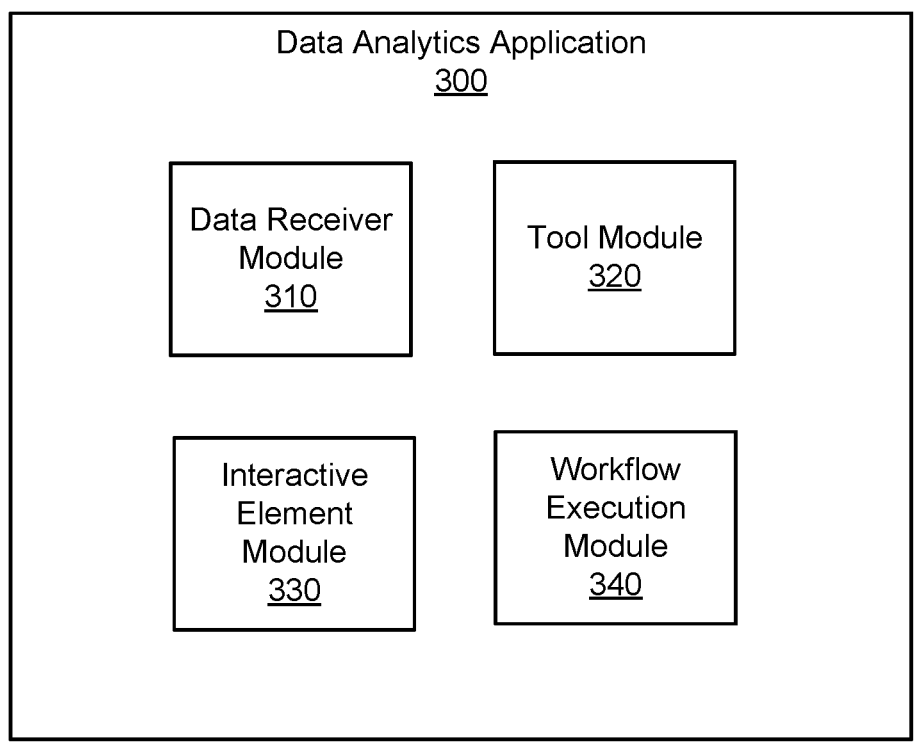
FIG. 3 is a block diagram illustrating a data analytics application according to one embodiment.

FIG. 3 is a block diagram illustrating a data analytics application 300 according to one embodiment. The data analytics application 300 facilitates creation and execution of interactive workflows. The data analytics application 300 is an embodiment of the data analytics application 150 in FIG. 1. In the embodiment of FIG. 3, the data analytics application 300 includes a data receiver module 310, a tool module 320, an interactive element module 330, and a workflow execution module 340. Those of skill in the art will recognize that other embodiments can have different and/or other components than the ones described here, and that the functionalities can be distributed among the components in a different manner.

The data receiver module 310 receives data files from data sources, e.g., the data sources 120, and provides the data files to other modules in the data analytics application 300. In one embodiment, the data receiver module 310 serves as the interface between the tools in the data analytics application, such as the input tools 206 illustrated in FIG. 2. In another embodiment, the data receiver module 310 is absent and the function of the data receiver module 310 is performed by the tools.

The tool module 320 provides a set of tools for creating workflows. Each tool performs a specific data analytics function. In some embodiments, the tool module 320 provide the tools included in the workflow 200 described in conjunction with FIG. 2. One or more tools of the tool module 320 may execute in parallel while processing data records for a workflow. A tool may run as multiple separate threads, with each thread operating on a separate core of the processor of the data analytics system 110. For example, an embodiment of the join tool distributes tasks associated with the join operation to multiple threads to leverage the parallel processing capabilities of the processor. A tool creates tasks to execute its operations. An operation of a tool includes one or more tasks. Each task is assigned to a thread of the tool for being performed by the thread.

In some embodiments, the set of tools are provided in a user interface (e.g., a GUI) supported by the user interface module 350. Each tool has an icon indicating the data analytics function of the tool. The user interface allows a user, e.g., a workflow designer, to select tools and define relationships (e.g., logical relationship or sequential relationship) between the selected tools to create a workflow. The user interface may provide a description of each tool, e.g., including information describing the data analytics function of the tool, that helps the designer to under the functions of the tools.

The interactive element module 330 provides interactive elements for creating interactive workflows. An interactive element is applicable to one or more tools and when applied to a tool, the interactive element is adapted to receive a user input and to use the user input to modify the operation of the tool. The interactive element defines an interface icon that is generated through execution of the interactive workflow and receives user inputs through the interface icon. The interactive element manipulates operation of the tool and/or other tools in the workflow. The interactive element supports various means how it receives the user input by using various types of interface icons. Example interface icons include checkboxes, clickable buttons, text fields, list boxes, drop lists, date fields, and so on. In some embodiments, one interactive element corresponds to more than one interface icons.

In some embodiments, the interactive element module 330 generates an interactive element for a particular tool in a workflow based on the data analytics function of the particular tool in the workflow. The interactive element module 330 analyzes the data analytics function of the particular tool in the workflow and selects the interactive element from a plurality of candidate interactive elements based on the analysis. For instance, the interactive element module 330 determines parameters to be used in the operation of the particular tool for performing its data analytics function and selects the interactive element based on the parameters. Taking a filter tool for example, the interactive element module 330 determines that the data analytics function of the tool is filtering data and that the tool will need filtering parameters to perform its function. Based on the determination, the interactive element module 330 generates for the tool an interactive element that defines an input box allowing a user to input a filtering parameter. In some embodiments, the interactive element module 330 generates the interactive element further based on the data file to be processed by the tool. In the example of the filter tool, the interactive element module 330 determines that the data file includes a plurality of variables. The interactive element module 330 identifies the variables in the data file and generates an interactive element that defines a dropdown list including the variables. A user can select a variable from the dropdown list, which is to be used by the filter tool as a filtering parameter.

In some other embodiments, the interactive element module 330 provides a plurality of candidate interactive elements to a workflow designer, e.g., in the GUI, and receives from the workflow designer a selection of the interactive element from the candidate interactive elements. Each candidate interactive element may have a symbol or a description indicating the type of interaction supported by the interactive element. The workflow designer can drag an interactive element from the candidate interactive elements based on the symbol or description of the interactive element. The user interface also allows the workflow designer to define a relationship between the interactive element with a tool, e.g., by connecting the interactive element to a tool to affiliate the interactive element with the tool or by inserting the interactive element into the workflow as a new tool preceding the tool in the workflow.

In some embodiments, the user interface supported by the interactive element module 330 and the user interface supported by the tool module 320 are integrated. For instance, the tools and the interactive elements are provided in the same user interface. Workflow designers may select any of the tools and the interactive elements and define relationships among them. With such a user interface, workflow designers can create new interactive workflows (e.g., adding a tool to the workflow and affiliating an interactive element with the tool before adding another tool to the workflow) or apply interactive elements to existing workflows to make the existing workflows interactive (e.g., creating/retrieving a workflow before affiliating an interactive element to one of the tools in the workflow).

The workflow execution module 340 facilitates execution of workflows (including interactive workflows). The workflow execution module 350 receives data files from the data receiver module 310 and sends the data files to workflows. Execution of the workflows generates result items. For interactive workflows, execution also generates interface icons. The interface icon is adapted to receive user inputs. The interface icon can be a checkbox, clickable button, text field, list box, dropdown list, date field, and so on. The interactive element facilitates transmission of user inputs from the interface icon to the particular tool in the interactive workflow. Also, the interactive element triggers an operation of the particular tool. The particular tool processes data based on the user inputs. In cases where there are tools subsequent to the particular tool in the workflow, the data will be further processes by these subsequent tools. That way, at least a part of the workflow is executed based on the user input.

In one example, the workflow execution module 350 first executes an interactive workflow without any user input. The first execution of the interactive flow generates a first result item and an interface icon defined by the interactive element in the interactive workflow. The interface icon receives a user input and sends the user input to the interactive element. In response to receiving the user input, the interactive element triggers re-execution (second execution) of at least a part of the interactive workflow based on the user input. The re-execution includes e.g., operations of the particular tool and tools subsequent to the particular tool, if any. The re-execution of the workflow generates a second result item, which incorporates the user input and is different from the first result item. The workflow execution module 340 provides the second result item for display to the user either as a replacement of the first result item or separately from the first result item.

In some embodiments, the workflow execution module 340 also logs information generated during execution of workflows, such as error messages, status of data processing, and so on. In some embodiments, the workflow execution module 340 facilitates a preview mode, through which workflow designers can test out workflows. The preview mode describes how workflows might function during actual execution.

FIG. 4A is a schematic diagram illustrating an interactive workflow 400 created using the data analytics application 150 according to one embodiment. FIG. 4B is a schematic diagram illustrating a result item generated by the interactive workflow 400 according to one embodiment. The interactive workflow 400 is a workflow including an interactive element 450 affiliated with one of the tools in the workflow. The interactive workflow 400 processes a data file and generates a result item 405 (shown in FIG. 4B) that represents an outcome of the processing.

The interactive workflow 400 has a sequence of tools, including an input tool 410, a filter tool 420, a formula tool 430 affiliated with the interactive element 450, and a browse tool 440. The interactive element 450 is not a part of the sequence. Rather, the interactive element 450 and the filter tool 420 form a branch of the interactive workflow 400. In other embodiments, the interactive workflow 400 may include different tools and/or more interactive elements. Also, the interactive element may be affiliated with a different tool.

The input tool 410 receives a data file, e.g., from a data source 120 illustrated in FIG. 1. The input tool 410 sends the data file to the filter tool 420. The filter tool 420 filters data in the data file based on one or more filtering parameters and generates a new data file. The filter tool 420 sends the new data file to the formula tool 430. In some embodiments, the filter tool 420 receives a filtering parameter through the interactive element 450.

The interactive element 450 includes an interface module 460 and an action module 470. The interface module 460 defines an interface icon, with which the user can interact to provide the filtering parameter. For instance, the interface module 460 specifies that the interface icon is an input box, clickable button, dropdown list, or other types of icons that users can interact with to provide filtering parameters. The interface module 460 is in communication with the interface icon and receives the filtering parameter provided by the user from the interface icon. In response to the interface module 460 receiving the filtering parameter, the action module 470 feeds the filtering parameter into the filter tool 420 and triggers an operation of the filter tool 420 based on the filtering parameter. The formula tool 430 and the browse tool 440, which are subsequent to the filter tool in the sequence, can be triggered by the action module 470 or the filter tool 420.

The formula tool 430 converts data in the new data file to result data based on a formula. The browse tool 440 receives the result data from the formula tool 430 and generates a result item 405 representing the new data. The result item is a graphical representation of the new data, such as a chart or a diagram. In FIG. 4B, the result item is a chart that includes a plurality of bars. Each bar indicates how many times an application was downloaded on the corresponding day. The browse tool 440 also generates an interface icon 415, e.g., based on an instruction from the interface module 460 that defines the interface icon. In the embodiment of FIG. 4B, the interface module 460 defines that the interface icon 415 is an input box, through which user can input text strings, and accordingly, the browse tool 440 generates the input box. The interface icon 415 is separate from the result item 405. However, in other embodiments, the browse tool 440 may integrate the interface icon 415 with the result item. For instance, result item includes a symbol (e.g., a bar, curve, box, or text string in the result item) that functions as the interface icon.

The browse tool 440 provides the result item 405 and the interface icon 415 for display to the user. The user can define a new filtering parameter by interacting with the interface icon, e.g., by specifying a particular day or particular days in the input box. As shown in FIG. 4B, the new filtering parameter is "weekdays." The new filtering parameter is sent to the interface module 460 of the interactive element 450 and further sent to the filter tool 420. The filter tool 420 is triggered by the action module 470 to filter data based on the new filtering parameter and thereby output data associated with weekdays. The data associated with weekdays is sent to the formula tool 430 for further processing. The formula tool 430 generates new result data, which is sent to the browse tool 440. The browse tool 440 generates a new result item 425, which shows the numbers of download of the application on weekdays.

In the embodiment of FIGS. 4A and 4B, the interactive element 450 is affiliated with the filter tool 420. In other embodiments, such as the embodiment of FIG. 5, an interactive element is applied to a workflow as a new tool in the workflow.

FIG. 5 is a schematic diagram illustrating another interactive workflow 500 created using the data analytics system 110 according to one embodiment. The interactive workflow 500 has a sequence of tools, including an input tool 510, an interactive tool 520, a filtering tool 530, a formula tool 550, and a browse tool 570. In other embodiments, the interactive workflow 400 may include different tools and/or more interactive elements.

Similar to the input tool 410, the input tool 510 receives a data file, e.g., from a data source 120 illustrated in FIG. 1. The input tool 510 sends the data file to the interactive tool 520.

The interactive tool 520 receives user input to manipulate execution of the interactive workflow 500. Different from the interactive element 450 in FIG. 4A, the interactive tool 520 is a part of the sequence of tools of the interactive workflow 500. The interactive tool 520 generates an interactive item (e.g., an interactive table, chart, etc.) based on the data file and provides the interactive table for display to a user. The interactive item illustrates the data in the data file to the user and allows the user to interact with components in the interactive table. For instance, the user can select a variable in the interactive table. The interactive tool 520 receives the user's interaction and sends it to the filter tool 530, which triggers an operation of the filter tool 530 based on the user interaction, e.g., the user's selection of the variable. The filter tool 520 uses the variable selected by the user to filter the data in the data file and generates a new data file. The filter tool 520 then sends the new data file to the formula tool 550, which applies a formula onto the new data file and generates a result data file. The browse tool 560 receives the result data file from the formula tool 550 and generates a result item.

Even though the interactive workflows 400 and 500 are both adapted to manipulate operations of filter tools 420 and 530 based on user inputs, the two interactive workflows 400 and 500 are created in different ways and operate differently. The interactive workflow 400 includes an interactive element (i.e., the interactive element 450) applied to the filter tool 420 and affiliated with the filter tool 420, versus the interactive workflow 500 includes an interactive tool (i.e., the interactive tool 520) that precedes the filter tool 530 in the interactive workflow 500.

The difference in the two interactive workflows 400 and 500 results in different experiences for designers and users. A designer can create the interactive workflow 500 more linearly as the interactive tool is one of the tools in the sequence. For instance, the designer can create the interactive workflow 500 through linear programming. Also, a user of the interactive workflow 500 is able to provide input before the operations of the filter tool 530, formula tool 540, and browse tool 550 and before the result item is generated, versus a user of the interactive workflow 400 who waits until the result item 405 and the interface icon 415 are generated to provide input. In one embodiment, a designer changes how user inputs are received in the interactive workflow 400. The designer can make the change by changing the interactive element 450 and need not modify the sequence of tools. Also, the interactive workflow 400 allows integration of the interface icon 415 with the result item 405; it is more convenient for the user to provide the input by interacting with the result item 405 without switching to a different item. The data analytics application 150 facilitates creation and execution of both the two interactive workflows 400 and 500 to meet different needs of designers and users.

FIG. 6 is a flow chart illustrating a process of generating an interactive workflow 600 according to one embodiment. In some embodiments, the process 600 is performed by the data analytics application 150, although some or all of the operations in the process 600 may be performed by other entities in other embodiments. In some embodiments, the operations in the process 600 are performed in a different order and can include different and/or additional steps.

The data analytics application 150 receives an analytics workflow. The analytics workflow comprises a sequence of tools. Each tool in the sequence performs a data analytics function, such as input, output, preparation, join, predictive, spatial, investigation, parse, transform, and so on.

The data analytics application 150 generates an interactive element for a tool in the sequence based on the data analytics function of the tool in the analytics workflow. The interactive element is adapted to receive a user input and to trigger an operation of the tool based on the user input. The interactive element defines an interface icon, through which a user can provide an input to manipulate the analytics workflow. The data analytics application 150 may also use a data file that the analytics workflow processes to generate the interactive element.

In some embodiments, the data analytics application 150 selects the interactive element from a plurality of interactive elements based on the data analytics function of the tool in the analytics workflow. In some other embodiments, the data analytics application 150 selects a plurality of interactive elements based on the data analytics function of the tool in the analytics workflow and provides the plurality of interactive elements to the user for the user to select one or more interactive elements from the plurality of interactive elements. The data analytics application 150 receives the user's selection of the interactive element.

The data analytics application 150 applies the interactive element to the tool to update the analytics workflow. The interactive element applied to the tool is adapted to receive a user interaction to modify the operation of the tool within the analytics workflow. For instance, the interactive element receives the user interaction from the interface icon, transmits the user interaction to the tool, and triggers the tool to perform the data analytics function based on the user interaction. In some embodiments, the data analytics application 150 affiliates the interactive element with the tool in the analytics workflow. In some other embodiments, the data analytics application 150 adds the interactive element into the data analytics workflow as a new tool. The new tool precedes the tool in the sequence.

The data analytics application 150 provides the updated analytics workflow for processing a data file. The updated analytics workflow is adapted to generate a result item representing an outcome of the processing of the data file. In some embodiments, the data analytics application 150 provides the updated analytics workflow for processing the data file on the client device. In some other embodiments, the data analytics application 150 provides the updated analytics workflow to a third-party server (e.g., a server running in the cloud) communicating with a client device and the data file is processed on the third-party server by using the updated analytics workflow. In embodiments where the interactive element receives a user input, e.g., through an interface icon in communication with the interactive element, the updated analytics workflow generates the result item based on the user input. The interface icon allows the user to change inputs so that the result item generated by the updated analytics workflow can be changed too.

The re-execution of the updated analytics workflow also includes operations of tools subsequent to the tool in the sequence. The re-execution of the updated analytics workflow results in generation of a new result item that is different from the result item and reflects the user input. The new result item can be provided in display in lieu of or in addition to the result item. The user can change the input through the interface icon to get another different result item that reflects the changed input.

Figure 7:
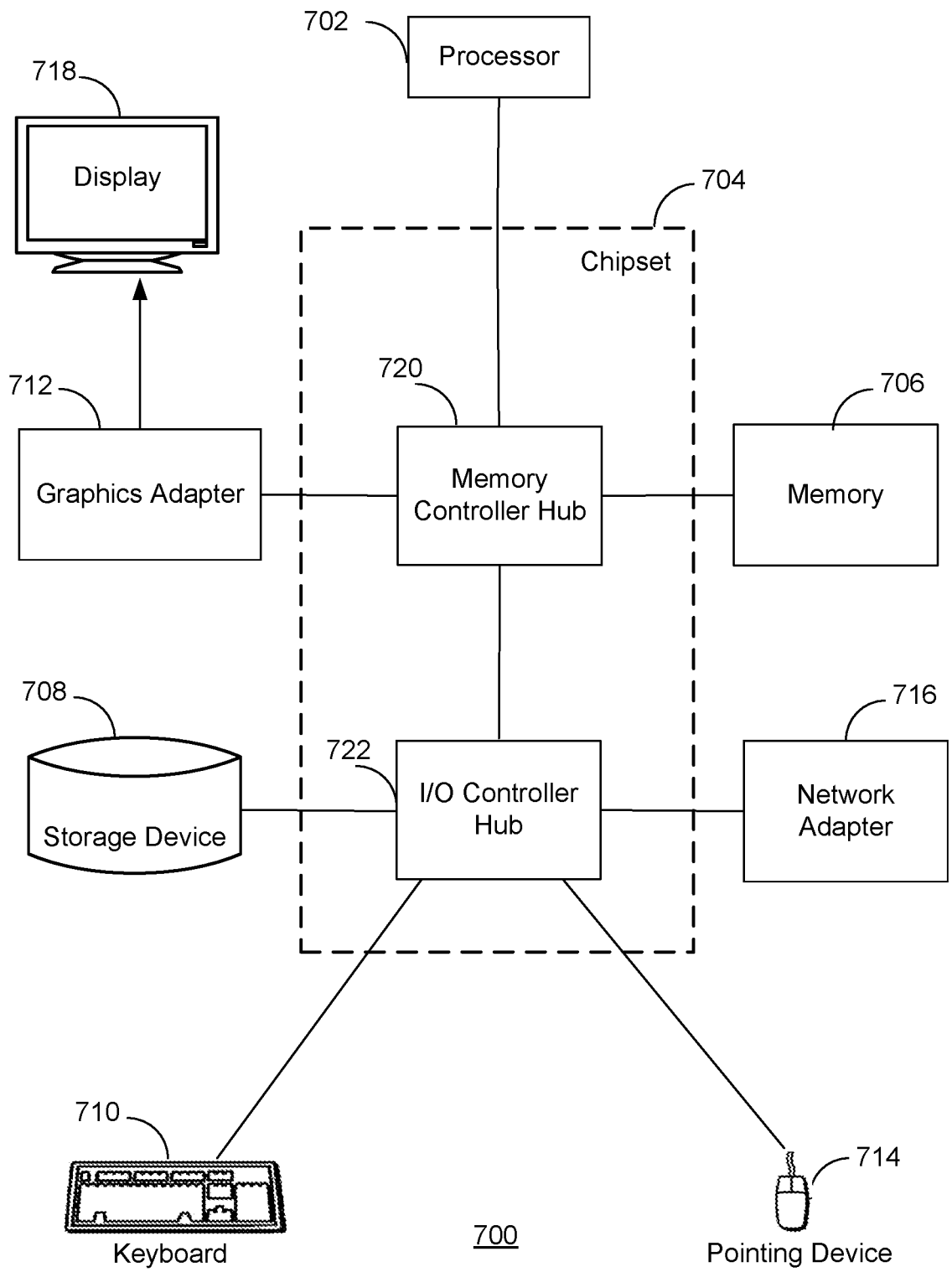
FIG. 7 is a high-level block diagram illustrating a functional view of a typical computer system for use as the data analytics system of FIG. 1 according to one embodiment.

FIG. 7 is a high-level block diagram illustrating a functional view of a typical computer system 700 for use as the machine learning server 110 of FIG. 1 according to an embodiment.

The illustrated computer system includes at least one processor 702 coupled to a chipset 704. The processor 702 can include multiple processor cores on the same die. The chipset 704 includes a memory controller hub 720 and an input/output (I/O) controller hub 722. A memory 706 and a graphics adapter 712 are coupled to the memory controller hub 720 and a display 718 is coupled to the graphics adapter 712. A storage device 708, keyboard 710, pointing device 714, and network adapter 716 may be coupled to the I/O controller hub 722. In some other embodiments, the computer system 700 may have additional, fewer, or different components and the components may be coupled differently. For example, embodiments of the computer system 700 may lack displays and/or keyboards. In addition, the computer system 700 may be instantiated as a rack-mounted blade server or as a cloud server instance in some embodiments.

The memory 706 holds instructions and data used by the processor 702. In some embodiments, the memory 706 is a random-access memory. The storage device 708 is a non-transitory computer-readable storage medium. The storage device 708 can be a HDD, SSD, or other types of non-transitory computer-readable storage medium. Data processed and analyzed by the machine learning server 110 can be stored in the memory 706 and/or the storage device 708.

The pointing device 714 may be a mouse, track ball, or other type of pointing device, and is used in combination with the keyboard 710 to input data into the computer system 700. The graphics adapter 712 displays images and other information on the display 718. In some embodiments, the display 718 includes a touch screen capability for receiving user input and selections. The network adapter 716 couples the computer system 700 to the network 170.

The computer system 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method, comprising:
    receiving an analytics workflow comprising a sequence of tools, each tool in the sequence performing a data analytics function;
    generating an interactive element for a tool in the sequence based on the data analytics function of the tool in the analytics workflow;
    applying the interactive element to the tool to update the analytics workflow, the interactive element adapted to receive a user input and to trigger an operation of the tool based on the user input; and
    providing the updated analytics workflow for processing a data file, the updated analytics workflow adapted to generate a result item representing an outcome of the processing of the data file.

2. The computer-implemented method of claim 1, further comprising:
    generating an interface icon in communication with the interactive element, the user input received through the interface icon and sent to the interactive element from the interface icon.

3. The computer-implemented method of claim 2, wherein the interface icon is an icon in the result item that represents a part of the outcome of the processing of the data file.

4. The method of claim 1, wherein generating the interactive element for the tool in the sequence based on the data analytics function of the tool in the analytics workflow comprises:
    selecting the interactive element from a plurality of interactive elements based on the data analytics function of the tool in the analytics workflow.

5. The method of claim 1, wherein generating the interactive element for the tool in the sequence based on the data analytics function of the tool in the analytics workflow comprises:
    selecting a plurality of interactive elements based on the data analytics function of the tool in the analytics workflow;
    providing the plurality of interactive elements to the user for the user to select one or more interactive elements from the plurality of interactive elements;
    receiving the user's selection of the interactive element; and
    generating the interactive element for the tool responsive to the received user selection.

6. The method of claim 1, wherein applying the interactive element to the tool comprises:

adding the interactive element into the data analytics workflow as a new tool that precedes the tool in the sequence.

7. The method of claim 1, wherein the interactive element is adapted to trigger an operation of another tool that is subsequent to the tool in the sequence to generate the different result item.

8. A non-transitory computer-readable memory storing executable computer program instructions, the instructions executable to perform operations comprising:
receiving an analytics workflow comprising a sequence of tools, each tool in the sequence performing a data analytics function;
generating an interactive element for a tool in the sequence based on the data analytics function of the tool in the analytics workflow;
applying the interactive element to the tool to update the analytics workflow, the interactive element adapted to receive a user input and to trigger an operation of the tool based on the user input; and
providing the updated analytics workflow for processing a data file, the updated analytics workflow adapted to generate a result item representing an outcome of the processing of the data file.

9. The non-transitory computer-readable memory of claim 8, wherein the operations further comprise:
generating an interface icon in communication with the interactive element, the user input received through the interface icon and sent to the interactive element from the interface icon.

10. The non-transitory computer-readable memory of claim 9, wherein the interface icon is an icon in the result item that represents a part of the outcome of the processing of the data file.

11. The non-transitory computer-readable memory of claim 8, wherein generating the interactive element for the tool in the sequence based on the data analytics function of the tool in the analytics workflow comprises:
selecting the interactive element from a plurality of interactive elements based on the data analytics function of the tool in the analytics workflow.

12. The non-transitory computer-readable memory of claim 8, wherein generating the interactive element for the tool in the sequence based on the data analytics function of the tool in the analytics workflow comprises:
selecting a plurality of interactive elements based on the data analytics function of the tool in the analytics workflow;
providing the plurality of interactive elements to the user for the user to select one or more interactive elements from the plurality of interactive elements;
receiving the user's selection of the interactive element; and
generating the interactive element for the tool responsive to the received user selection.

13. The non-transitory computer-readable memory of claim 8, wherein applying the interactive element to the tool comprises:
adding the interactive element into the data analytics workflow as a new tool that precedes the tool in the sequence.

14. The non-transitory computer-readable memory of claim 8, wherein the interactive element is adapted to trigger an operation of another tool that is subsequent to the tool in the sequence to generate the different result item.

15. A computer system, comprising:
a computer processor for executing computer program instructions; and
a non-transitory computer-readable memory storing computer program instructions executable by the computer processor to perform operations comprising:
receiving an analytics workflow comprising a sequence of tools, each tool in the sequence performing a data analytics function;
generating an interactive element for a tool in the sequence based on the data analytics function of the tool in the analytics workflow;
applying the interactive element to the tool to update the analytics workflow, the interactive element adapted to receive a user input and to trigger an operation of the tool based on the user input; and
providing the updated analytics workflow for processing a data file, the updated analytics workflow adapted to generate a result item representing an outcome of the processing of the data file.

16. The computer system of claim 15, wherein the operations further comprise:
generating an interface icon in communication with the interactive element, the user input received through the interface icon and sent to the interactive element from the interface icon.

17. The computer system of claim 15, wherein generating the interactive element for the tool in the sequence based on the data analytics function of the tool in the analytics workflow comprises:
selecting the interactive element from a plurality of interactive elements based on the data analytics function of the tool in the analytics workflow.

18. The computer system of claim 15, wherein generating the interactive element for the tool in the sequence based on the data analytics function of the tool in the analytics workflow comprises:
selecting a plurality of interactive elements based on the data analytics function of the tool in the analytics workflow;
providing the plurality of interactive elements to the user for the user to select one or more interactive elements from the plurality of interactive elements;
receiving the user's selection of the interactive element; and
generating the interactive element for the tool responsive to the received user selection.

19. The computer system of claim 15, wherein applying the interactive element to the tool comprises:
adding the interactive element into the data analytics workflow as a new tool that precedes the tool in the sequence.

20. The computer system of claim 15, wherein the interactive element is adapted to trigger an operation of another tool that is subsequent to the tool in the sequence to generate the different result item.

* * * * *